Oct. 26, 1937.     M. FELIX     2,096,848
APPARATUS FOR PREPARING INFUSIONS
Filed May 21, 1934     2 Sheets-Sheet 1
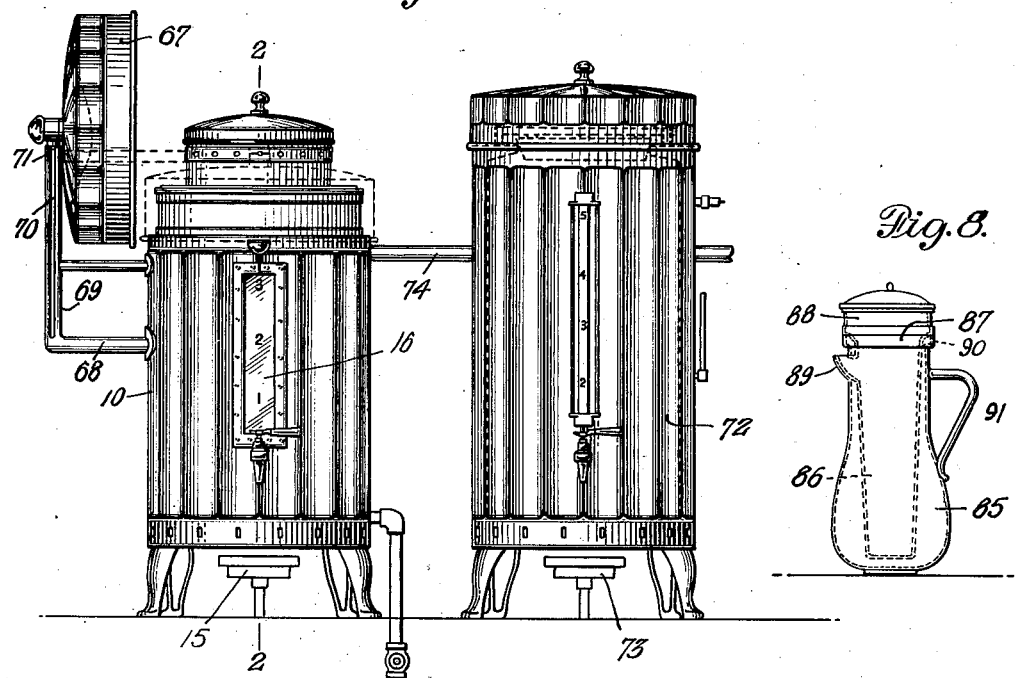
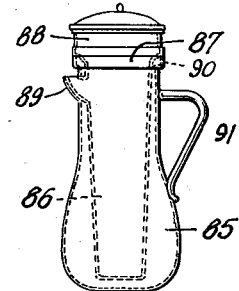
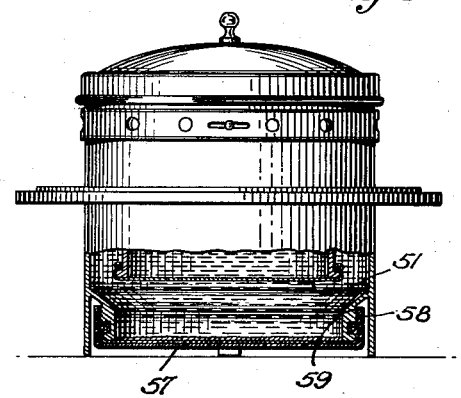
INVENTOR
MICHAEL FELIX,
BY Richard K. Stevens
ATTORNEY Oct. 26, 1937.   M. FELIX   2,096,848
APPARATUS FOR PREPARING INFUSIONS
Filed May 21, 1934   2 Sheets-Sheet 2

INVENTOR
MICHAEL FELIX,
BY
Richard K. Stevens
ATTORNEY

Patented Oct. 26, 1937

2,096,848

UNITED STATES PATENT OFFICE 2,096,848

APPARATUS FOR PREPARING INFUSIONS

Michael Felix, Flushing, N. Y.

Application May 21, 1934, Serial No. 726,779

3 Claims. (Cl. 53—3)

This invention relates to the art of preparing beverage coffee and specifically it relates to coffee urn constructions and a method of utilizing the same.

Beverage coffee for years has been one of the most popular beverages particularly suited for consumption at mealtime, but during recent years considerable study has been given to beverage coffee since it has been determined by physicians and scientists that such beverage unless prepared from ground coffee in proper condition and prepared by certain recognized procedure, does contain substances which are injurious when consumed in substantial and regular amounts.

It has been proven by authoritative analysis that beverage coffee, when improperly prepared, contains numerous types of chemical substances among which are caffein, tannic acid, nitrogenous substances, dextrin, crude fiber, petroleum, and other extracts. A report covering such an investigation of coffee has been published by Brazilian-American Coffee Promotion Committee, the report having been prepared by Samuel C. Prescott, S. B. Sc. D., Professor of Industrial Microbiology and Director, Department of Biology and Public Health Massachusetts Institute of Technology.

The above referred to report indicates that extended inquiry led to the belief that the method of preparing a beverage coffee is of the greatest significance from the standpoint of physiological effect upon the consumer than has commonly been believed and that the factors necessary to be considered in the preparation of coffee involve the coffee itself, that is its freshness, degree of roast and fineness of grind, the character of the water, the temperature of the water, the character of the container used in infusing, the infusion time, the strength of infusion, and the effect of the addition of other substances.

It is an object of the present invention to overcome the difficulties heretofore encountered in the preparation of beverage coffee and the invention contemplates the provision of an apparatus in which the beverage prepared therein will be free of those injurious constitutents present in beverage coffee as usually prepared.

An additional object of this invention is the provision of a coffee urn in which the coffee after being prepared is maintained in a heated condition below the boiling point of water, and in which the coffee and the water to be employed in the making of the beverage, after being heated, are both maintained out of contact with metallic surfaces.

It is an additional object of this invention to provide a glass beverage container which is heated indirectly through the medium of water contained in an outer receptacle, and in which the glass container may be readily removed when replacement thereof becomes necessary or desirable.

The invention still further contemplates the provision of a coffee urn having an outer receptacle containing water and an inner transparent receptacle for the coffee beverage, with a sight glass arranged in the wall of the outer receptacle through which the quantity of coffee in the beverage receptacle may be observed.

It is also contemplated by this invention that a ground coffee holder be provided in which the coffee is maintained upon a filter cloth in a loose condition so as to permit the ready passage of heated water therethrough, and such a holder which is adapted to be removed from the remainder of the urn and maintained so that the filter cloth is immersed in water thus avoiding drying and concentration of coffee within the filter cloth. As distinguished from this procedure, if the filter cloths are permitted to dry between brewing operations objectionable odor is derived therefrom and exists in the beverage thereafter brewed.

Other objects and advantages will be apparent from the following detailed description when considered in connection with the accompanying drawings wherein;

Fig. 1 is an elevational view of a water heater and coffee urn made in accordance with the present invention;

Fig. 3 is an elevational view of the coffee holder with the filter assembly removed from the urn and positioned on a support in a manner in which the filter cloths are maintained immersed in water;

Fig. 7 is an elevational view of a household type urn made in accordance with this invention, and Fig. 8 is an elevational view of a coffee pot with the features of this invention incorporated therein.

Figure 2:
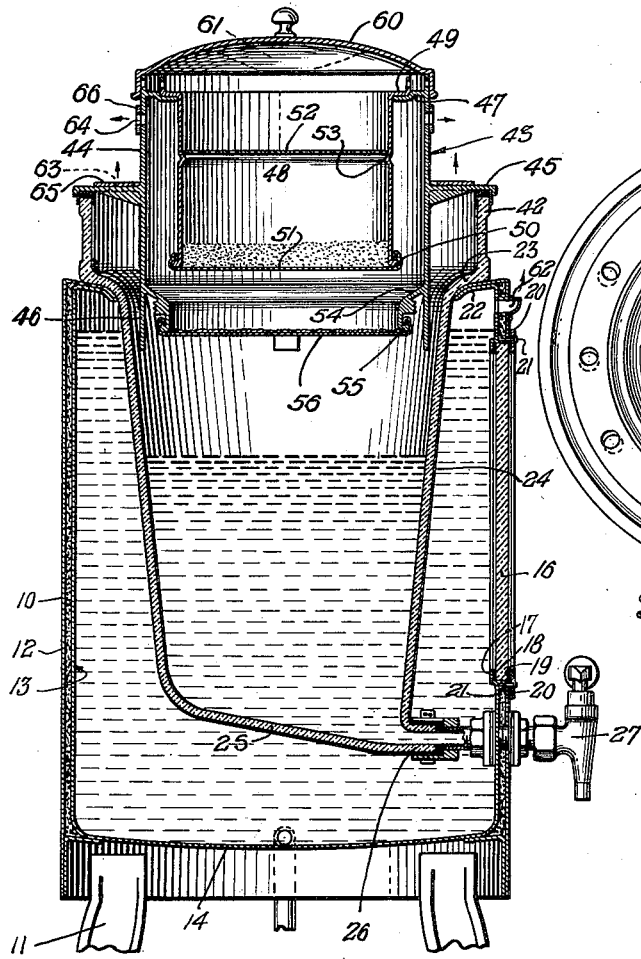
Fig. 2 is a vertical sectional view taken on line 2—2 of Fig. 1.
Figure 4:
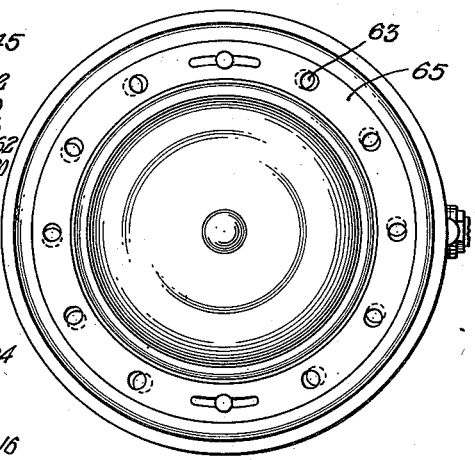
Fig. 4 is a top plan view of the urn with the outer cover removed.
Figure 6:
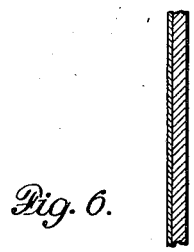
Fig. 6 is a detailed sectional view of a metallic wall used in the apparatus illustrating the porcelain enameled lining.
Figure 5:
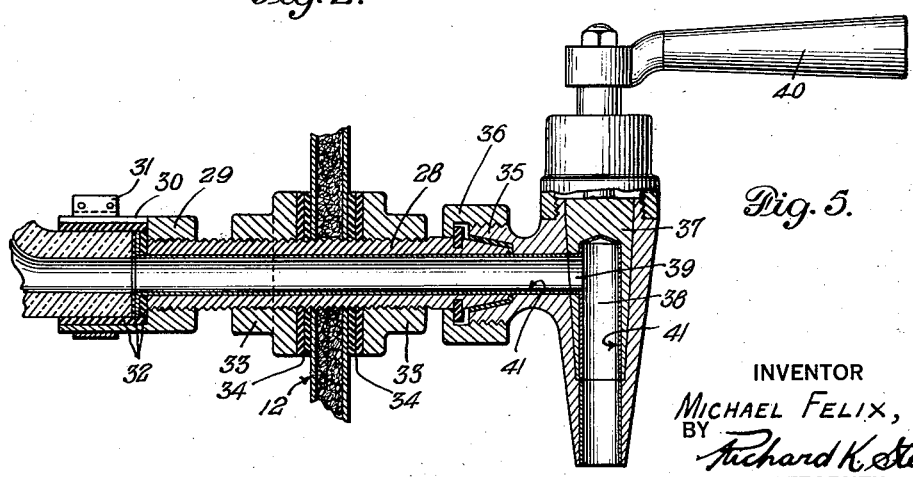
Fig. 5 is a detailed sectional view of the draw-off cock.

Now in referring to the drawings in detail, the numeral 10 designates an outer double walled receptacle supported on legs 11, which receptacle has insulation 12 arranged between those walls. The interior of the inner wall of the receptacle is lined with porcelain enamel as at 13, whereby water which is contained in this outer receptacle is prevented from becoming contaminated from contact with its metal wall. The bottom 14 of the receptacle is, of course, not insulated since it is through this bottom that the heat generated at the burner 15 is applied to the water within the receptacle.

A sight glass 16 is arranged in the wall of the receptacle 10, and it is clamped in position in any suitable manner for rendering the joints watertight. In the specific construction illustrated, the inner wall of the receptacle 10 is struck inwardly to form a flange 17, and a packing 18 is arranged thereagainst, which packing exists between the flange and the glass 16. Another packing 19 is arranged on the exterior of the glass and a frame 20 is clamped thereagainst by means of bolts 21 which are screwed into the wall proper. When the sight glass is removed the space then existing in the wall of the receptacle provides a hand opening for a repairer.

The upper ends of the double wall of the receptacle are bent inwardly to form a partially concaved seat 22 upon which is positioned a shoulder 23 of an inner container 24 and this container is preferably constructed of non-expansible or "oven" glass. Container 24 tapers in a downwardly direction and has a slanting bottom 25 and a tubular extension 26. Extension 26 is connected to the cock 27 by means of a porcelain lined connecting pipe 28. The extension 26 has a smooth exterior, and a casting 29 is adapted to be secured thereto by means of a split sleeve 30 which is adapted to be compressed by a contractible band 31. Packing elements 32 are provided at this joint to render the same watertight. Casting 29 is internally screwthreaded and the exteriorly threaded pipe 28 is screwed thereinto with the interior of the pipe being of the same diameter as the interior of the extension 26. Packing nuts 33 are mounted on the pipe 28 on each side of the wall 12 and packing members 34 are arranged between the respective packing nuts 33 and the wall so as to render the connection watertight. Cock 27 has a watertight ground joint connection 35 with the pipe 28, and a draw-up nut 36 is utilized to maintain the connection. The cock is preferably provided with a rotary hollow plug 37 having a longitudinal bore 38 and a lateral port 39, which port is adapted to be moved so as to establish a communication between the bore 38 and the interior of the pipe 28 upon movement of the handle 40. Each of the metallic parts of the cock 27 and pipe 28, which are normally subject to contact with the beverage while in storage or as it is drawn from the container 24, is porcelain lined as indicated at 41.

The upper portion of the container 24 is enlarged as at 42 and it is constructed sufficiently strong to support the coffee infusion mechanism upon the rim thereof. This coffee infusion mechanism is indicated generally at 43 and it may be constructed either of glass or metal, but if constructed of metal the metallic parts which are contacted by the liquid or vapors should be coated with porcelain enamel. Furthermore, the contacting parts of the portion 42 and the infusion mechanism are protected by porcelain enameled metal clamped over rubber rings.

The infusion device 43 has an outer casing 44 and a circumferential flange 45, which flange engages upon the rim of the container 24. The flange is turned downwardly at its edge so that after being engaged upon the rim, accidental displacement of the infusion device is substantially avoided and the infusion device is properly aligned with the lower portion thereof extending into the container 24. The casing 44 is provided with legs 46 which are adapted to be used for supporting the infusion device when the same is placed on a counter or other supports as indicated in Fig. 3. The upper portion of the casing 44 has an inwardly extending flange 47 which is adapted to receive an inner container 48, which container is supported on the flange 47 through the medium of a flange 49. Container 48 is provided at its bottom with an annular bead 50 over which a muslin or other suitable filter cloth 51 is stretched by means of the customary drawstring. It is upon this filter cloth 51 that the ground coffee is supported in the operation of the urn and the ground coffee is loosely held upon the filter cloth. The coffee is thus permitted to float freely within the container 48 as water is poured thereon, but the floating of the coffee is restricted by the recticulated plate 52. Plate 52 also acts to distribute the water over the entire surface of the coffee as distinguished from delivering it to the coffee in a single stream. This plate 52 is supported upon an inwardly extending rib 53 pressed from the wall of the container 48.

At the lower end of the casing 44 and inwardly of its legs 46, the casing is reduced in diameter as indicated at 54. An annular bead 55 is arranged on the extreme end of the reduced portion 54 and a filter cotton cloth 56, preferably of the type having an upper fluffy or fibrous surface and a lower normal woven surface, is secured thereon by the customary drawstring.

As shown in Fig. 3 a cap or closure member 57 is adapted to be screwed over the lower filter cloth 56, and the cap 57 is provided with threads 58 which engage with threads 59 arranged on the exterior of the reduced portion 54 of casing 44 so that when the infusion device is removed from the remainder of the urn, washed and cleaned, the cap 57 may be secured in position and the infusion device filled with water to a level above both filter cloths 51 and 56 so that these filter cloths can be maintained in a moist condition when the infusion device is not being utilized.

A cover 60 is formed to fit over the upper edge of the casing 44 and this cover may have a downwardly extending central portion 61 which will act to direct the flow of any condensed vapors to the center of the cover so that the liquid formed thereby will be directed downwardly into the container 48.

Vent 62 arranged in the receptacle 10 is adapted to permit the exhaust of vapor and to eliminate the creation of pressure within the receptacle, while vents 63 and 64 respectively arranged in its flange 45 and the upper portion of the wall of a casing 44 permit the escape of vapors from the inner container 24 and from the interior of the infusion device. Vents 63 are adapted to be closed or opened at will by an annular valve plate 65 which is formed with openings adapted to be registered with the vents 63 or to be moved out of registry therewith, and vents 64 are adapted to be opened or closed by a circular valve band 66 which also has openings therein adapted to be registered with the vents or to be moved out of registry therewith.

In Fig. 1 a cover 67 is supported upon a bracket 68 which is secured to the receptacle 10, and the bracket 68 is provided with a vertical split tube 69 which is adapted to have a rod 70 telescoped therein, which rod is attached to the cover 67. When the rod 70 is drawn upwardly to the top of the tube 69 a swivel connection is provided at 71, and the cover is adapted to be swung into position shown in dotted lines. The receptacle 72 is provided for the heating of water to be hereinafter referred to, and it is preferably double walled and insulated and adapted to be heated by the heat generated by the burner indicated at 73. This receptacle 72 is provided with a tight fitting plug cover and a clamp therefor as illustrated. The interior is easily accessible for cleaning when the cover is removed, but the tight cover when in position protects the water from contamination. A brace 74 is provided for holding the receptacles 10 and 72 in position. The cover 67 is only adapted to be used after the infusion device has been removed from the urn, but, of course, this cover 67 may be enlarged if desired so that it will fit over the infusion device while it is in position in the urn structure.

A modified form of urn particularly suited for houshold use is illustrated in Fig. 7 and this urn is constructed generally in accordance with the urn illustrated in Figs. 1 to 6. In this modified form a receptacle 75 is utilized and this receptacle is provided with handles 76, and legs 77. The urn is adapted to be heated by an electrical resistance element (not shown) and electric current is applied thereto by means of conductors 78. The upper portion of the receptacle 75 is reduced as at 79 to provide a support for an infusion mechanism 80, which mechanism is constructed substantially identical with the infusion mechanism previously described. The receptacle 75 has a sight glass 81 to permit the determination of the amount of coffee within the inner receptacle 82. Vents 84 are provided in the receptacle 75 for the same reason as the vents described in connection with the form of urn above described.

In Fig. 8 a modification is illustrated which is suitable for use as a household coffee pot. This modification utilizes an outer receptacle 85 and an inner receptacle 86. The upper portion 87 of the receptacle 86 is arranged to support an infusion mechanism 88 similar to that described in connection with the other modifications, and the infusion mechanism is preferably removed before the pot is tilted for the purpose of pouring coffee from the spout 89. A vent 90 is provided in the receptacle 85 just above the handle 91 so that there is no tendency for the water to be poured from the space between the receptacle 85 and the container 86 when the pot is tilted. In utilizing the pot shown in Fig. 8 the same may be heated on any conventional type of stove.

In preparing coffee beverage in accordance with the method of this invention either of the modifications may be employed but the method will be described specifically in connection with the form of apparatus illustrated in Figs. 1 to 6 inclusive.

The burner 15 is put in operation and the water within the receptacle 10 is heated to a point below the boiling point of the water. At the same time, the burner 73 is put in operation and the water in receptacle 72 is brought up nearly to but below its boiling point. Cap 57 is removed from the bottom of the infusion mechanism and the water is drained therefrom and after the cover 60 and plate 52 are removed, ground coffee is placed in a loose condition upon the filter cloth 51. This mechanism is then positioned with its flange 45 resting upon the rim of the portion 42 of the coffee container 24 after the cover 67 has been moved back to a position shown in Fig. 1. Hot water just below the boiling point is then withdrawn from receptacle 72 preferably into a porcelain enameled lined receptacle and the water is poured into the infusion mechanism upon the plate 52 which has now been placed in position as shown in Fig. 2 and the water passes readily through the ground coffee and first through the filter 51 which prevents the passage of large foreign particles and the coffee is thereafter passed through the filter cloth 56 which is of a character capable of retaining even fine foreign particles so that the coffee as it is passed through the receptacle 24 is of a clear nature. As the water passes through the infusion device the temperature drops slightly so that the coffee being treated is subjected to a temperature substantially below that of boiling water. It has been found that approximately two pounds of ground coffee is sufficient to produce three gallons of beverage coffee and, due to the construction of the infusion mechanism, the coffee is permitted to be in a sufficiently non-compacted condition as the water is passed through so that the bulk of the water in passing through the coffee is not in contact therewith for a period exceeding two minutes.

Due to the arrangement of the controlled vents 63 and 64, the escape of vapors and air is permitted both from the compartment in which the beverage flows after its passage through the filter cloth 51 and from the space within the receptacle 24. These vents provide for the relief of pressure whereby the water is permitted to pass quickly through the ground coffee. By adjusting the vent openings, the rate at which the pressure in the inner container is released may be determined so as to control the rate at which the water passes through the coffee.

The beverage within the receptacle 24 is only indirectly heated and it is free of contact with any metal parts so that the beverage as drawn through cock 27 is of a high quality and is free of objectionable chemical ingredients. Additionally the coffee is free of objectionable ingredients such as result from boiling or subjection to high temperature steam as well as from a long period infusion operation.

After the beverage coffee has been produced in the receptacle 24 the infusion mechanism is removed from its operative position and the coffee grounds are removed therefrom. The cap 57 is then secured into position and water is placed in the infusion mechanism so as the immerse both filter cloths.

The cover 67 is placed back in position after the removal of the infusion device and the quantity of coffee existant within the receptacle 24 can be readily ascertained by viewing the same through the sight glass 16 since the coffee is visible through the wall of the receptacle 24 and through the water between the receptacle 24 and the wall of the receptacle 10. When the coffee is drained to a point sufficiently low to warrant the production of additional beverage the operation above described can be repeated.

Cloth is used as the filter in the present operation instead of paper or other substances because of its freedom from readily decomposable chemical elements which would be carried into the beverage. Moreover, the cloth allows the coffee beverage to filter through the coffee grounds within the time specified by scientific researches in order to extract only the valuable substances of the coffee bean.

What I claim is:

1. An infusion urn comprising an opaque receptacle, a glass container within the said receptacle suspended from the upper portion thereof and adapted to be indirectly heated through the medium of water arranged in the receptacle but external of the container, a tubular integral extension on the glass container, a discharge pipe extending through the receptacle wall and anchored therein, a valve connected to the discharge pipe exteriorly of the receptacle wall, a connection between the pipe and container which fits over and is clamped upon the tubular extension, and a removable section in the wall of the receptacle adjacent the tubular extension on the container which is adapted to be removed to permit access to the connection so as to afford ready removal of the glass container, said discharge pipe and valve being formed with non-metallic inner surfaces in the discharge passages.

2. An infusion urn comprising a glass container within the said receptacle adapted to be indirectly heated, said glass container being formed with a tubular integral extension, a valve controlled discharge pipe extending through the wall of the receptacle and connected at its inner end to the tubular extension, a transparent section movably secured in the receptacle wall adjacent to the said integral extension, said section being adapted to be removed to permit access to the connection between the said integral extension and the said discharge pipe so as to afford ready removal of the container from the receptacle and said section also acting as a sight glass to permit the contents of the container to be seen when the parts of the urn are in assembled position.

3. An infusion urn comprising a metallic receptacle, a glass container within the said receptacle adapted to be indirectly heated through the medium of water in the receptacle, said glass container being formed with a tubular integral extension, a valve controlled discharge pipe extending through the wall of the receptacle and connected at its inner end to the tubular extension by an adjustable clamp arranged within the receptacle, a transparent section detachably secured in the receptacle wall adjacent to the clamp, said section being adapted to be removed to permit access to the said clamp and connection so as to afford ready removal of the same from the glass container and therefore ready removal of the container from the receptacle and said section also acting as a sight glass to permit the contents of the container to be seen when the parts of the urn are in assembled position.

MICHAEL FELIX.